(12) United States Patent
Lin

(10) Patent No.: US 7,200,017 B2
(45) Date of Patent: *Apr. 3, 2007

(54) CONTROLLER AND DRIVING METHOD FOR SUPPLYING ENERGY TO DISPLAY DEVICE CIRCUITRY

(75) Inventor: Yung-Lin Lin, Palo Alto, CA (US)

(73) Assignee: O2Micro International Limited, Grand Cayman (KY)

( * ) Notice: Subject to any disclaimer, the term of this patent is extended or adjusted under 35 U.S.C. 154(b) by 198 days.

This patent is subject to a terminal disclaimer.

(21) Appl. No.: 10/756,007

(22) Filed: Jan. 13, 2004

(65) Prior Publication Data

US 2004/0178781 A1    Sep. 16, 2004

Related U.S. Application Data

(63) Continuation of application No. 10/348,748, filed on Jan. 22, 2003, now Pat. No. 6,778,415.

(51) Int. Cl.
*H02M 7/539* (2006.01)
(52) U.S. Cl. .............................. 363/71; 363/97; 363/98; 363/131; 363/132; 363/134
(58) Field of Classification Search ............... 363/17, 363/21.12, 21.13, 25, 71, 72, 97, 98, 131, 363/132, 134
See application file for complete search history.

(56) References Cited

U.S. PATENT DOCUMENTS 4,464,606 A    8/1984    Kane ........................... 315/158
4,535,399 A    8/1985    Szepesi ........................ 363/41
4,541,041 A    9/1985    Park et al. ..................... 363/41
4,672,528 A    6/1987    Park et al. ..................... 363/98

(Continued)

FOREIGN PATENT DOCUMENTS

JP    S60-97302    1/1987

(Continued)

OTHER PUBLICATIONS

Korean Notice of Preliminary Rejection, Official Action, with English translation, dated Nov. 16, 2005. (8 pgs).

(Continued)

*Primary Examiner*—Jeffrey Sterrett
(74) *Attorney, Agent, or Firm*—Grossman, Tucker, Perreault & Pfleger PLLC

(57) ABSTRACT

A controller for controlling at least two power circuits comprises a phase-shift selector for generating a reference signal according to variable input signals, the reference signal is programmed to indicate an amount of phase-delay according to a number of CCFL power circuits connected; and a pulse generator for receiving the reference signal and generating a pulse signal CLK in response to the received reference signal, the pulse signal is coupled to the CCFL power circuits connected for initiating the operation of the CCFL power circuits. The controller is used to control energy supplying to an electrical circuit comprising multiple CCFL power circuits and is more particularly to provide phase delay to the electrical circuit. Usually, the electrical circuit is applied to display devices, such as liquid crystal display monitors, liquid crystal display computers and liquid crystal display televisions.

23 Claims, 13 Drawing Sheets

U.S. PATENT DOCUMENTS

| | | | |
|---|---|---|---|
| 4,727,469 A | 2/1988 | Kammiller | 363/56 |
| 4,794,506 A | 12/1988 | Hino et al. | 363/25 |
| 4,814,962 A | 3/1989 | Magalhaes et al. | 363/16 |
| 4,833,584 A | 5/1989 | Divan | 363/37 |
| 4,855,888 A | 8/1989 | Henze et al. | 363/17 |
| 4,860,189 A | 8/1989 | Hitchcock | 363/132 |
| 4,864,483 A | 9/1989 | Divan | 363/37 |
| 4,912,622 A | 3/1990 | Steigerwald et al. | 363/98 |
| 4,935,857 A | 6/1990 | Nguyen et al. | 363/17 |
| 4,952,849 A | 8/1990 | Fellows et al. | 315/307 |
| 4,953,068 A | 8/1990 | Henze | 363/17 |
| 4,992,919 A | 2/1991 | Lee et al. | 363/17 |
| 5,017,800 A | 5/1991 | Divan | 307/66 |
| 5,027,263 A | 6/1991 | Harada et al. | 363/16 |
| 5,027,264 A | 6/1991 | DeDoncker et al. | 363/16 |
| 5,105,127 A | 4/1992 | Lavaud et al. | 315/291 |
| 5,113,334 A | 5/1992 | Tuson et al. | 363/25 |
| 5,132,888 A | 7/1992 | Lo et al. | 363/17 |
| 5,132,889 A | 7/1992 | Hitchcock et al. | 363/17 |
| 5,157,592 A | 10/1992 | Walters | 363/17 |
| 5,198,969 A | 3/1993 | Redl et al. | 363/17 |
| 5,208,740 A | 5/1993 | Ehsani | 363/124 |
| 5,231,563 A | 7/1993 | Jitaru | 363/98 |
| 5,235,501 A | 8/1993 | Stuart et al. | 363/17 |
| 5,268,830 A | 12/1993 | Loftus, Jr. | 363/17 |
| 5,285,372 A | 2/1994 | Huynh et al. | 363/132 |
| 5,291,382 A | 3/1994 | Cohen | 363/16 |
| 5,305,191 A | 4/1994 | Loftus, Jr. | 363/17 |
| 5,363,020 A | 11/1994 | Chen et al. | 315/209 R |
| 5,384,516 A | 1/1995 | Kawabata et al. | 315/160 |
| 5,394,064 A | 2/1995 | Ranganath et al. | 315/209 |
| 5,402,329 A | 3/1995 | Wittenbreder, Jr. | 363/16 |
| 5,412,557 A | 5/1995 | Lauw | 363/37 |
| 5,418,703 A | 5/1995 | Hitchcock et al. | 363/17 |
| 5,420,779 A | 5/1995 | Payne | 363/56 |
| 5,422,546 A | 6/1995 | Nilssen | 315/219 |
| 5,430,632 A | 7/1995 | Meszlenyi | 363/17 |
| 5,430,641 A | 7/1995 | Kates | 363/133 |
| 5,448,155 A | 9/1995 | Jutras | 323/285 |
| 5,448,467 A | 9/1995 | Ferreira | 363/17 |
| 5,481,160 A | 1/1996 | Nilssen | 315/209 R |
| 5,510,974 A | 4/1996 | Gu et al. | 363/134 |
| 5,514,921 A | 5/1996 | Steigerwald | 307/125 |
| 5,546,300 A | 8/1996 | Lee et al. | 363/132 |
| 5,559,395 A | 9/1996 | Venkitasubrahmanian | 315/247 |
| 5,559,688 A | 9/1996 | Pringle | 363/89 |
| 5,583,402 A | 12/1996 | Moisin et al. | 315/307 |
| 5,615,093 A | 3/1997 | Nalbant | 363/25 |
| 5,619,402 A | 4/1997 | Liu | 363/20 |
| 5,638,260 A | 6/1997 | Bees | 363/17 |
| 5,646,836 A | 7/1997 | Sadarnac et al. | 363/98 |
| 5,669,238 A | 9/1997 | Devers | 62/657 |
| 5,684,683 A | 11/1997 | Divan et al. | 33/65 |
| 5,694,007 A | 12/1997 | Chen | 315/247 |
| 5,712,533 A | 1/1998 | Corti | 315/169.3 |
| 5,715,155 A | 2/1998 | Shahani et al. | 363/132 |
| 5,719,474 A | 2/1998 | Vitello | 315/307 |
| 5,731,652 A | 3/1998 | Shimada | 310/316 |
| 5,736,842 A | 4/1998 | Jovanovic | 323/222 |
| 5,742,495 A | 4/1998 | Barone | 363/65 |
| 5,742,496 A | 4/1998 | Tsutsumi | 363/95 |
| 5,744,915 A | 4/1998 | Nilssen | 315/209 R |
| 5,748,457 A | 5/1998 | Poon et al. | 363/16 |
| 5,764,494 A | 6/1998 | Schutten et al. | 363/17 |
| 5,774,346 A | 6/1998 | Poon et al. | 363/17 |
| 5,781,418 A | 7/1998 | Chang et al. | 363/16 |
| 5,781,419 A | 7/1998 | Kutkut et al. | 363/17 |
| 5,784,266 A | 7/1998 | Chen | 363/16 |
| 5,796,598 A | 8/1998 | Nowak et al. | 363/37 |
| 5,818,172 A | 10/1998 | Lee | 315/86 |
| 5,834,889 A | 11/1998 | Ge | 313/493 |
| 5,844,378 A | 12/1998 | LoCascio et al. | 315/307 |
| 5,844,540 A | 12/1998 | Terasaki | 345/102 |
| 5,854,617 A | 12/1998 | Lee et al. | 345/102 |
| 5,856,916 A | 1/1999 | Bonnet | 363/20 |
| 5,875,103 A * | 2/1999 | Bhagwat et al. | 363/17 |
| 5,880,940 A | 3/1999 | Poon | 363/20 |
| 5,886,477 A | 3/1999 | Honbo et al. | 315/209 PZ |
| 5,886,884 A | 3/1999 | Baek et al. | 363/48 |
| 5,894,412 A | 4/1999 | Faulk | 363/56 |
| 5,900,700 A | 5/1999 | Arndt et al. | 315/291 |
| 5,910,709 A | 6/1999 | Stevanovic et al. | 315/225 |
| 5,917,722 A | 6/1999 | Singh | 363/132 |
| 5,923,129 A | 7/1999 | Henry | 315/307 |
| 5,930,121 A | 7/1999 | Henry | 363/16 |
| 5,932,976 A | 8/1999 | Maheshwari et al. | 315/291 |
| 5,939,830 A | 8/1999 | Praiswater | 315/DIG. 4 |
| 5,946,200 A | 8/1999 | Kim et al. | 363/17 |
| 6,011,360 A | 1/2000 | Gradzki et al. | 315/244 |
| 6,075,325 A | 6/2000 | Kouno et al. | 315/307 |
| 6,114,814 A | 9/2000 | Shannon et al. | 315/219 |
| 6,259,615 B1 | 7/2001 | Lin | 363/98 |
| 6,316,881 B1 | 11/2001 | Shannon et al. | 315/219 |
| 6,469,453 B2 | 10/2002 | Tajika et al. | 315/199 |
| 6,501,234 B2 * | 12/2002 | Lin et al. | 315/307 |
| 6,574,125 B2 * | 6/2003 | Matsukawa et al. | 363/71 |
| 6,600,296 B2 * | 7/2003 | Hazucha | 323/237 |
| 6,707,264 B2 * | 3/2004 | Lin et al. | 315/307 |
| 6,778,415 B2 * | 8/2004 | Lin | 363/71 |

FOREIGN PATENT DOCUMENTS

| | | |
|---|---|---|
| JP | 01-186161 | 7/1989 |
| JP | H10-290574 | 10/1998 |
| JP | 2000-188873 | 7/2000 |
| JP | 2000-324686 | 11/2000 |
| JP | 13-235720 | 8/2001 |
| JP | 2002-43089 | 2/2002 |
| JP | 2002-184590 | 6/2002 |
| JP | 14-354823 | 12/2002 |
| KR | 1998-66276 | 10/1998 |
| WO | 02/056643 | 7/2002 |

OTHER PUBLICATIONS

"An Introduction to the Principles and Features of Resonant Power Conversion", Steve Freeland, from *Recent Developments in Resonant Power Conversion*, Intertec Communications, Inc., 1998, pp. 20-43.

"Zero-Voltage Switching Technique in DC/DC Converters", Kwang-Hwa Lie and Fred C. Lee, from *Recent Developments in Resonant Power Conversion*, Intertec Communications, Inc., 1988, pp. 211-223.

"A New and Improved Control Technique Greatly Simplifies the Design of ZVS Resonant Inverters and DC/DC Power Supplies", Mehmet K. Nalbant, 1995 IEEE, pp. 694-701.

*Switching Power Supply Design*, Abraham L. Pressman, McGraw-Hill, 1991, pp. 93-104; 471-492.

Phase Shifted, Zero Voltage Transition Design Considerations and the UC3875 PWM Controller, by Bill Andreycak, Unitrode, Application Note, May 1997, pp. 1-14.

"Fixed-Frequency, Resonant-Switched Pulse Width Modulation with Phase-Shifted Control", by Bob Mammano and Jeff Putsch, from *Power Supply Design Seminar*, Unitrode, 1991, pp. 5-1 to 5-7.

"Zero Voltage Switching Resonant Power Conversion", by Bill Andreycak, from *Power Supply Design Seminar*, Unitrode, 1991, pp. A2-1 to A2-24; and A2-1A to A2-3A.

"Resonant Mode Converter Topologies", by Bob Mammano, from *Power Supply Design Seminar*, Unitrode, 1991, pp. P3-1 to P3-12.

"The New UC3879 Phase-Shifted PWM Controller Simplifies the Design of Zero Voltage Transition Full-Bridge Converters", by Laszio Balogh, Unitrode, Application Note, 1995, pp. 1-8.

"A Comparative Study of a Class of Full Bridge Zero-Voltage-Switched PWM Converters", by W. Chen et al., 1995 IEEE, pp. 893-899.

"Optimum ZVS Full-Bridge DC/DC Converter with PWM Phase-Shift Control; Analysis, Design Considerations, and Experimental Results", by Richard Red I et al., 1994 IEEE, pp. 159-165.

"A Frequency/PWM Controlled Converter with Two Independently Regulated Outputs", by R.A. Fisher et al., HFPC, May 1989, pp. 459-471.

"High Density Power-Hybrid Design of a Half-Bridge Multi-Resonant Converter", by Richard Farrington, et al., HFPC-Virginia Polytechnic Institute, May 1990, pp. 26-33.

"Small-signal Analysis of the Zero-Voltage Switched Full-Bridge PWM Converter", V. Vlatkovic et al., HFPC-Virginia Polytechnic Institute, May 1990, pp. 262-272.

"Feasible Characteristic Evaluations of Resonant Tank PWM Inverter-Linked DC-Dc High Power, Converters for Medical-Use High-Voltage Application", by H. Takano et al., 1995 IEEE, pp. 913-919.

Japan Office Action dated Mar. 22, 2005, with an English translation, from related Japanese application (4 pgs).

Japanese Office Action, dated Mar. 14, 2005, from related Japanese application with English translation (4 pgs).

Korean Office action, dated Mar. 29, 2005, from related Korean application with English Translation (4 pgs).

Notice of final rejection from related Korean application, dated Jun. 14, 2006, with English translation (6 pgs).

Notice of the First Office Action from related Japanese application, dated Jul. 20, 2006, with English translation (11 pgs).

Notification of the First Office Action from related Chinese application, dated Jul. 21, 2006, with English translation (11 pgs).

* cited by examiner m=3 EXAMPLE

| sel 0 | sel 1 | sel 2 | sel 3 | Vaa |
|---|---|---|---|---|
| 0 | 0 | 0 | 0 | 1/16 |
| 0 | 0 | 0 | 1 | 2/16 |
| 0 | 0 | 1 | 0 | 3/16 |
| 0 | 0 | 1 | 1 | 4/16 |
| 0 | 1 | 0 | 0 | 5/16 |
| 0 | 1 | 0 | 1 | 6/16 |
| 0 | 1 | 1 | 0 | 7/16 |
| 0 | 1 | 1 | 1 | 8/16 |
| 1 | 0 | 0 | 0 | 9/16 |
| 1 | 0 | 0 | 1 | 10/16 |
| 1 | 0 | 1 | 0 | 11/16 |
| 1 | 0 | 1 | 1 | 12/16 |
| 1 | 1 | 0 | 0 | 13/16 |
| 1 | 1 | 0 | 1 | 14/16 |
| 1 | 1 | 1 | 0 | 15/16 |
| 1 | 1 | 1 | 1 | 16/16 |

FIG. 6

CONTROLLER AND DRIVING METHOD FOR SUPPLYING ENERGY TO DISPLAY DEVICE CIRCUITRY

This application is a continuation-in-part application of application Ser. No. 10/348,748 filed Jan. 22, 2003, now U.S. Pat. No. 6,778,415, the teachings of which are incorporated herein by reference. This application is also a continuation-in-part of U.S. application Ser. No. 10/299,206 filed Nov. 19, 2002, and now U.S. Pat. 6,707,264, which itself is a continuation application of U.S. application Ser. No. 09/757,265, filed Jan. 9, 2001, now U.S. Pat. No. 6,501,234, all of which are incorporated herein by reference.

BACKGROUND OF THE INVENTION

1. Field of the Invention

The present invention generally relates to electrical circuits for supplying energy to multiple loads, such as CCFL (Cold-Cathode-Fluorescent-Lamp) loads and more particularly to electrical circuits for providing phase shifts or multiple loads. Usually, the electrical circuits are applied to display devices, such as liquid crystal display monitors, liquid crystal display computers or liquid crystal display televisions.

2. Description of the Related Art

CCFL loads are extensively used to provide backlighting for liquid crystal displays (LCD), particularly for backlighting LCD monitors and LCD televisions. However, such conventional applications require a separate direct current/alternative current power inverter (DC/AC power inverter) to drive an individual CCFL. Such an application is illustrated in FIG. 1, wherein each CCFL (20, 22, . . . 24) is powered by an individual DC/AC inverter (10, 12, . . . 14), respectively, and all DC/AC inverters are synchronized. Each DC/AC inverter includes a switched AC network and a power driver circuit. The power driver circuit may include a resonant tank circuit for the CCFL. The switched AC network in each inverter is driven ON/OFF synchronously. Therefore, there is a large ripple on the power line. A large current will be drawn from the power source $V_{Batt}$ when the switches in the switched networks are turned on and the current drawn is released when the switches are turned off. The simultaneous turning on and off at all inverters cause noises on the power line which degrades the signal/noise integrity in the system.

One method to reduce the ripple is to increase the filtering at the power line. However, the disadvantage is that the size of the circuit is increased, which in turn increases the system cost.

FIG. 2 shows another prior art circuit for driving multiple CCFL loads where the circuit includes a controller (40) for driving multiple DC/AC inverters (10, 12, 14, . . . 16) and CCFL loads (20, 22, 24, . . . 26). A clock generator (42) in the controller (40) generates a string of phase-shifted clock signals to each DC/AC inverter (10, 12, 14, . . . 16) to make a phase delay. Since the switches in the networks of all DC/AC inverters (10, 12, 14, . . . 16) are turned on and turned off with equal phase shift between the adjacent inverters, the ripple on the power line is effectively reduced to 1/N of that shown in FIG. 1, where N is the number of DC/AC inverters connected.

However, the problem is that the controller (40) is fixed to the number of original demanded loads, in other words, the number of CCFL loads equals to the lines which deliver phase shifts from the controller (40) to each inverter (10, 12, 14, . . . 16). Therefore, if the number of CCFL loads is changed, the configuration of the controller (40) should be changed. Another disadvantage is that the controller (40) needs to generate a high-frequency clock signal having a frequency of N times the operating frequency of the individual DC/AC inverter.

SUMMARY OF THE INVENTION

A simpler controller of a simpler phase shift circuit techniques is disclosed, wherein a simpler user-programmable number of phase shifts or phase delay according to the number of inverters connected is used, such that a high power, low cost and smaller multiple-inverter system can be achieved.

An improved electrical circuit and a driving method thereof are also disclosed. The electrical circuit comprises multiple CCFL power circuits, such as DC/AC inverters, for driving multiple CCFL loads, which reduces instantaneous high current ripples and noises caused be turning ON and turning OFF switches in the power circuits simultaneously. The electrical circuit can be applied to a display device comprising at least two loads, such as CCFL loads. The display device may be an LCD monitor, an LCD television or an LCD computer.

Briefly, the controller of the present invention comprises a phase-shift selector for generating a reference signal according to variable input signals, the reference signal is programmed to indicate an amount of phase-delay according to a number of CCFL power circuits connected; and a pulse generator for receiving the reference signal and generating a pulse signal CLK in response to the received reference signal, the pulse signal is coupled to the CCFL power circuits connected for initiating the operation of the CCFL power circuits. In addition, the electrical circuit in accordance with the present invention provides a phase shift or phase delay of the switching ON/OFF between CCFL power circuits for driving CCFL loads, wherein the amount of the phase-delay for each CCFL power circuit is stepwise increased according to operation sequence of the CCFL power circuits.

According to electrical circuit of the present invention, each of the connected CCFL power circuits comprises a phase-delay selector for programming a phase-delay of the CCFL power circuit, wherein the amount of the phase-delay for each CCFL power circuit is stepwise increased according to operation sequence of the CCFL power circuits. For example, the first CCFL power circuit is initiated immediately (without delay) after the pulse signal CLK is received. The second CCFL power circuit is initiated after a predetermined amount of phase-delay, such as one unit ($\Delta T$) of phase-delay, with respect to the initiation of the first CCFL power circuit. The third CCFL power circuit is initiated after a predetermined amount of phase-delay, such as two units of phase-delay, with respect to the initiation of the first CCFL power circuit, whereby all CCFL power circuits are turned on and turned off with equal phase-delay between the adjacent power circuits.

According to the present invention, the ripple on the power line is thus effectively reduced, the controller and the electrical circuit are programmable and simplified and the cost is reduced.

BRIEF DESCRIPTION OF THE DRAWINGS

For a more complete understanding of the present invention and the advantages thereof, reference is now made to the following descriptions taken in conjunction with the accompanying drawings which illustrate the embodiments of the present invention, wherein:

FIG. 6 is an exemplary schematic of the input signals coupled to the selector circuit and their corresponding output signals;

DETAILED DESCRIPTION OF THE PREFERRED EMBODIMENTS

Figure 1:
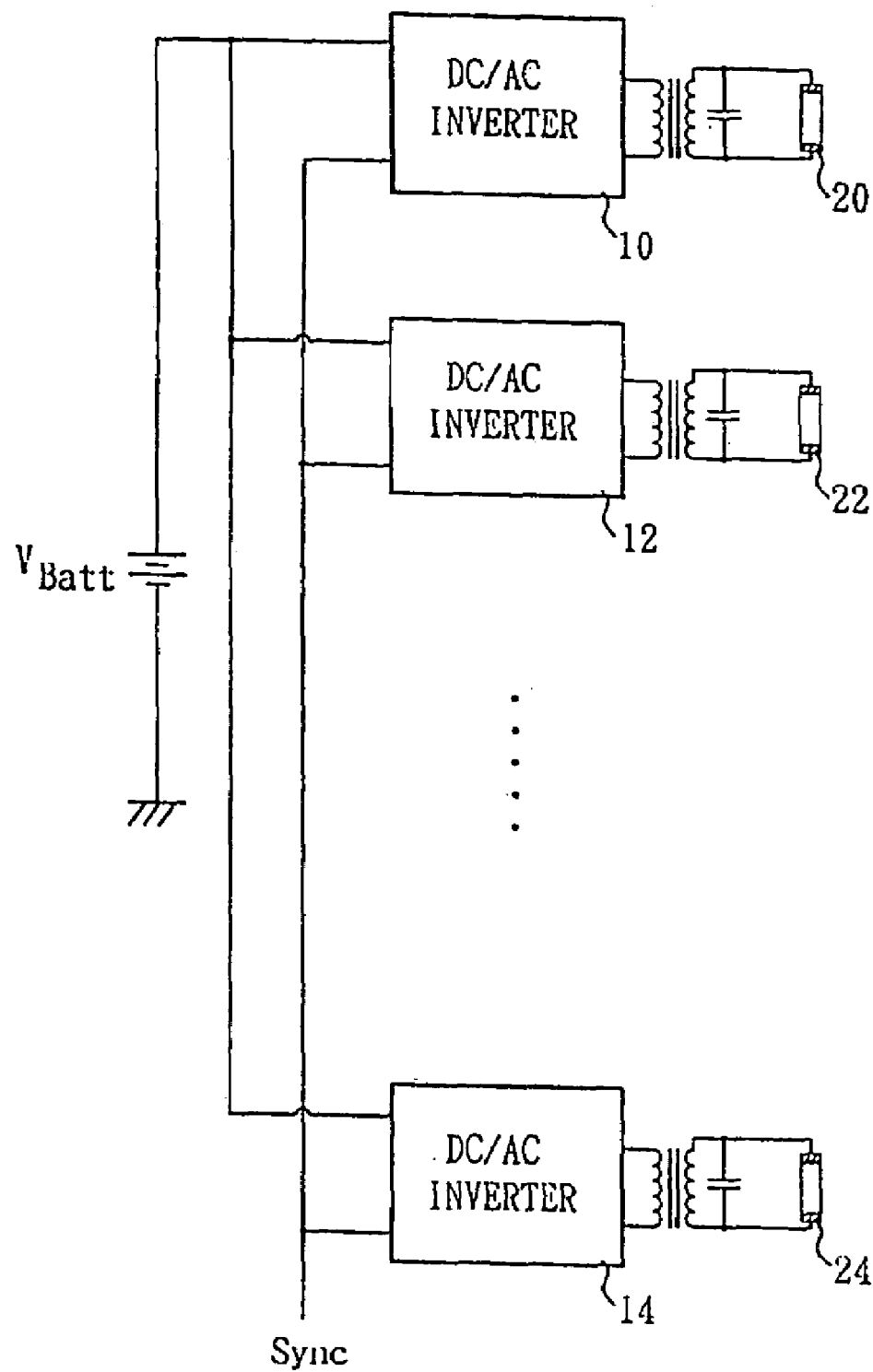
FIG. 1 is a schematic diagram depicting a prior art circuit used for driving multiple CCFL loads, wherein all DC/AC inverters are synchronized in driving the CCFL loads.
Figure 2:
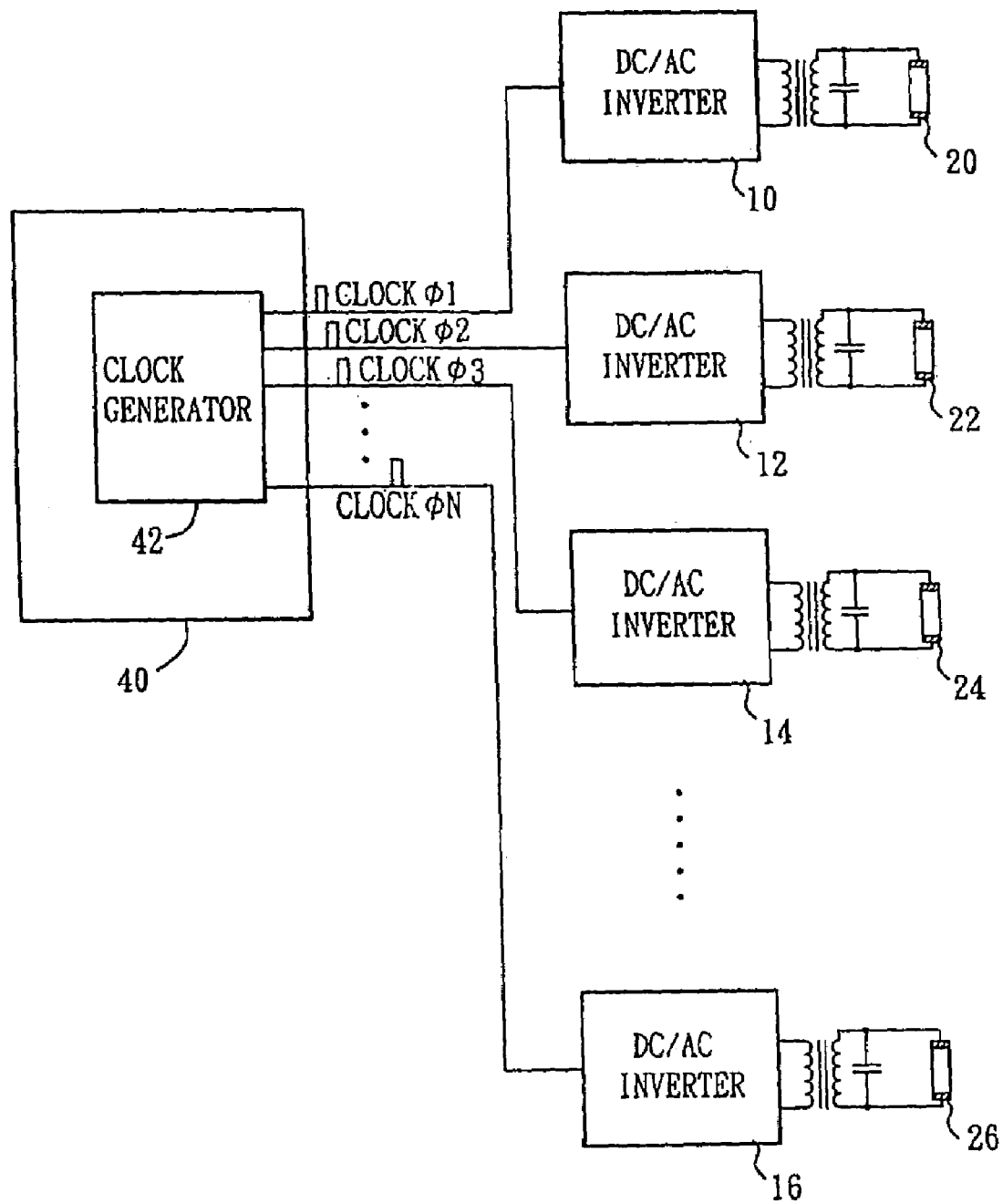
FIG. 2 is a schematic diagram depicting a prior art circuit used for driving multiple CCFL loads, wherein the circuit includes a controller and multiple DC/AC inverters and the controller generates a string of phase delay clock signals to the multiple DC/AC inverters.
Figure 3:
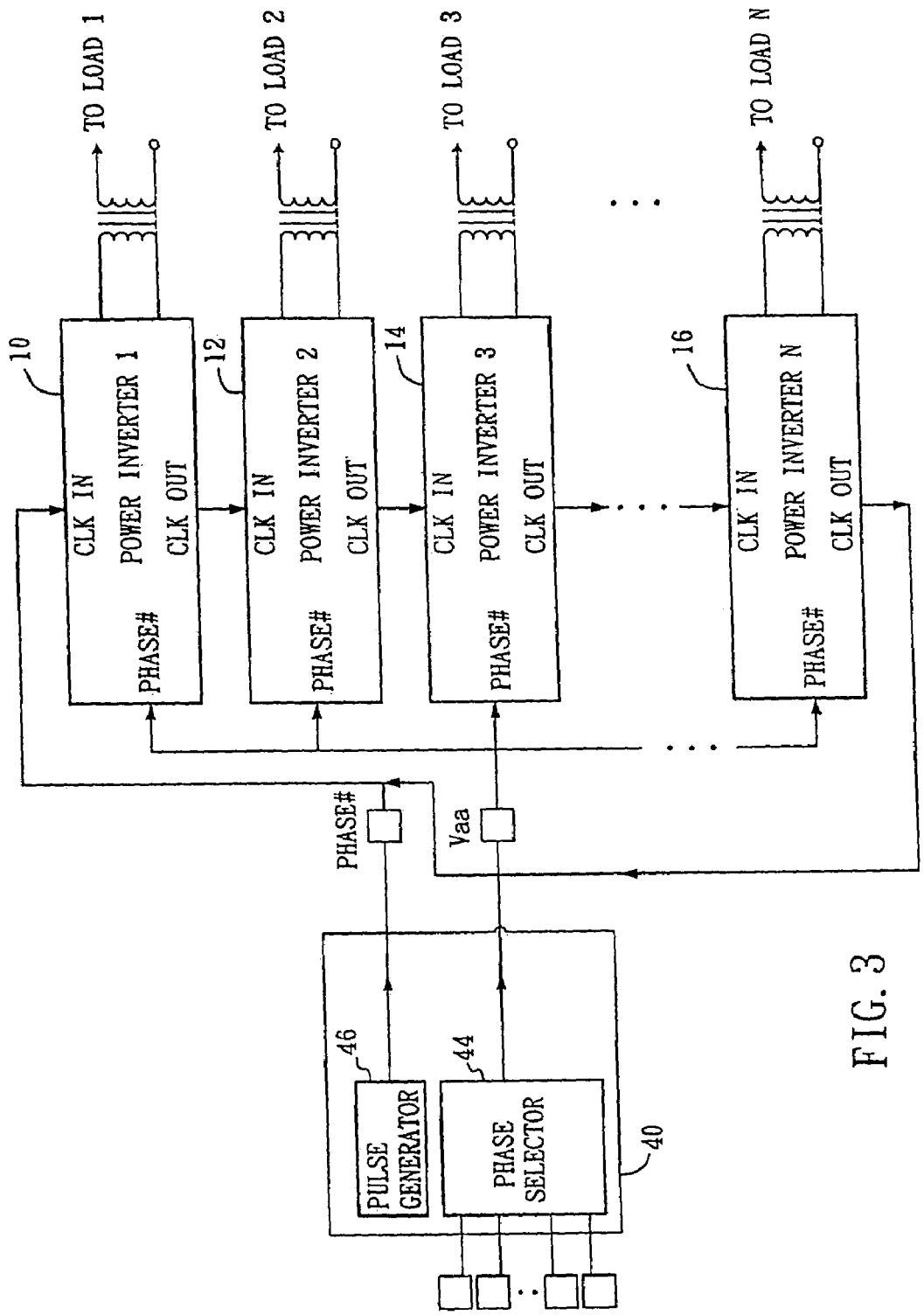
FIG. 3(a) is a block diagram of an electrical circuit in accordance with the present invention that is used for driving multiple CCFL loads.
FIG. 3(b) is a block diagram of another electrical circuit in accordance with the present invention that is used for driving multiple CCFL loads.

FIG. 3(a) is a block diagram of the electrical circuit in accordance with the present invention used for driving multiple loads, such as light source loads or CCFL loads. The electrical circuit comprises a controller (40) and at least two power circuits (10, 12), such as DC/AC inverters for CCFL loads. The controller (40) comprises a selector (44), such as a phase selector, and a pulse generator (46), such as an oscillator.

The selector (44) generates a reference signal according to variable input signals and the reference signal is coupled to the at least two power circuits (10,12) for indicating a number of power circuits controlled or a number of phases to be shifted. That is to say, if there are four power circuits to be connected, an output of the selector (44) will output a reference signal that represents four power circuits being connected by the variable input signal(s). Therefore, the power circuits to be controlled can be programmable according to the input signal(s) without changing the circuit arrangements of the control circuit (40) and the power circuits (10, 12). The selector (44) can be a digital-to-analog converter or an analog-input-analog-output circuit.

The pulse generator (46) generates a first pulse signal and the first pulse signal is coupled to a first power circuit (10) of the at least two power circuits (10, 12) for initiating the operation of the first power circuit (10) of the at least two power circuits (10, 12). The first power circuit (10) then outputs a second pulse signal to initiate the operation of a second power circuit (12) of the at least two power circuits (10, 12). The at least two power circuits (10, 12) are each coupled to a transformer and a load, such as a light source or a CCFL, so as to supply energy to the loads.

For simplification, the operation of the electrical circuit of the present invention comprising two power circuits is explained as follows:

The selector (44) first generates a reference signal to the two power circuits (10, 12) according to the input signal(s) coupled to the selector (44) for indicating a number of power circuits controlled (the number is two in this case). The pulse generator (46) then generates a first pulse signal to a first power circuit (10) for initiating the operation of the first power circuit (10). The first power circuit (10) is coupled to a first transformer which is coupled to a first load, such as a light source or a CCFL, and controls the operation of the first load. The first power circuit (10) outputs a second pulse signal to a second power circuit (12) for initiating the operation of the second power circuit (12), wherein the second pulse signal is delayed with respect to the first pulse signal sent to the first power circuit (10). The second power circuit (12) is coupled to a second transformer which is coupled to a second load, such as a light source or a CCFL, and controls the operation of the second load. Likewise, the second power circuit (12) outputs a third pulse signal to the first power circuit (10) for the second operational cycle. The third pulse signal is delayed with respect to the second pulse signal sent to the second power circuit (12). The first power circuit (10) then outputs a fourth pulse signal, wherein the fourth pulse signal is delayed with respect to the third pulse signal sent to the first power circuit (10). It is usually the pulse signal output from the last power circuit as the input pulse signal to the first power circuit.

Figure 3B:
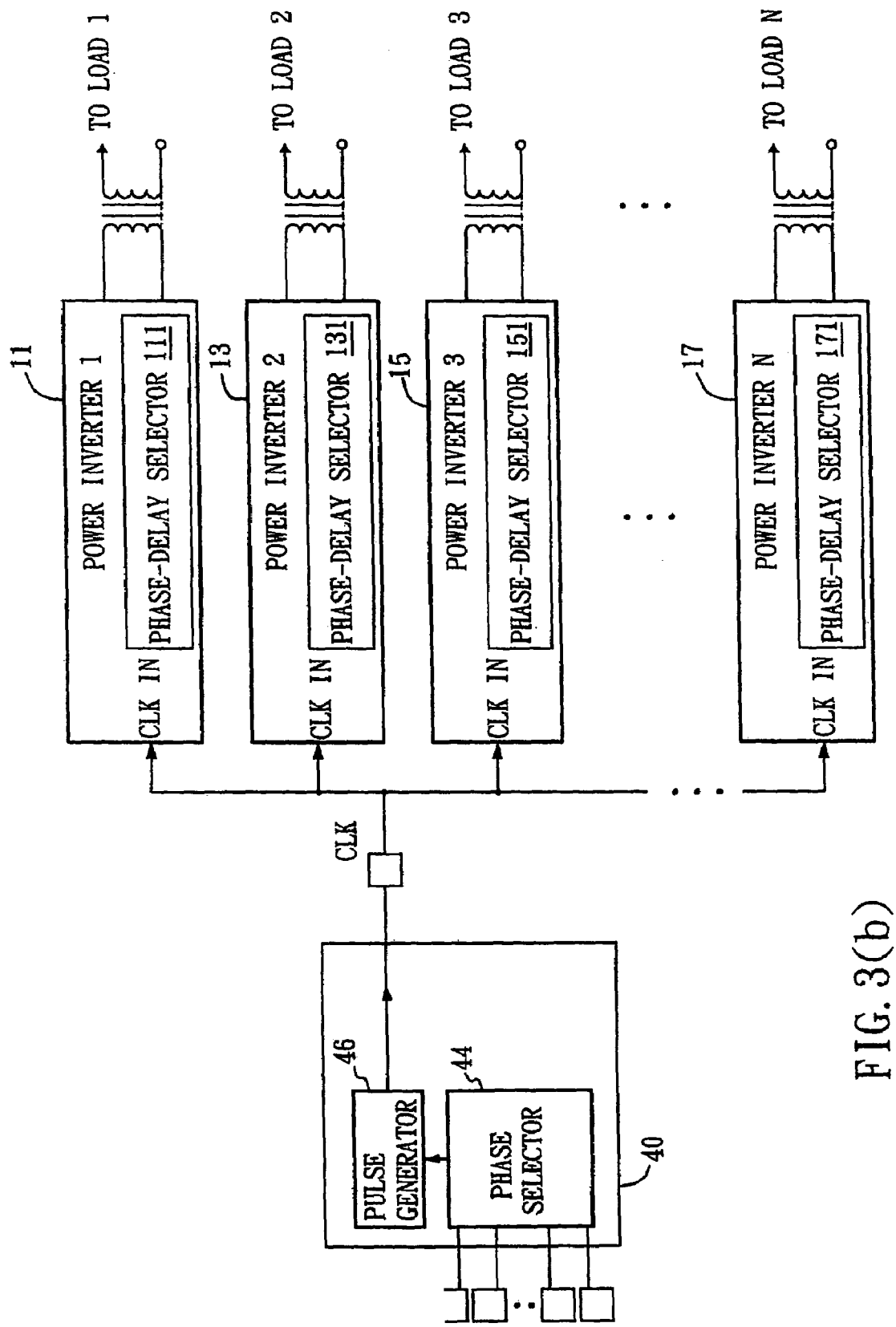

FIG. 3(b) illustrates a block diagram of a second electrical circuit in accordance with the present invention that is used for driving multiple CCFL loads. In the second embodiment, the controller (40) comprises a phase-shift selector (44 for generating a reference signal according to variable input signals, the reference signal is programmed to indicate an amount of phase-delay according to a number of CCFL power circuits connected; and a pulse generator (46) for receiving the reference signal and generating a pulse signal CLK in response to the received reference signal, the pulse signal is coupled to the at least two CCFL power circuits (11,13) for initiating the operation of the at least two CCFL power circuits (11,13).

Each of the at least two CCFL power circuits (11,13) comprises a phase-delay selector (111 or 131) for programming an amount of phase-delay of the CCFL power circuit (11 or 13), wherein the amount of the phase-delay for each CCFL power circuit (11,13) is stepwise increased according to operation sequence of the CCFL power circuits (11,13). For example, the first CCFL power circuit (11) is initiated immediately (without delay) after the pulse signal CLK is received. The second CCFL power circuit (13) is initiated after a predetermined amount of phase-delay, such as one unit (ΔT) of phase-delay, with respect to the initiation of the first CCFL power circuit (11). Likewise, a third CCFL power circuit (15) is initiated after a predetermined amount of phase-delay, such as two units of phase-delay, with respect to the initiation of the first CCFL power circuit (11). The at least two power circuits (11,13) are each coupled to a transformer and a load, such as a light source or a CCFL load, so as to supply energy to the loads. With such an arrangement, each power circuit (11,13,15 . . . ) is turned on and turned off with equal phase-delay. After all of the power circuits are initiated and de-initiated, the operation cycle is repeated.

According to the present invention, the two power circuits (10, 12; 11,13) are turned on and turned off with equal phase shift or phase delay. Therefore, the ripple on the power line is thus effectively reduced, the circuit is programmable and simplified and the cost is reduced. The advantages of the present invention will be more apparent when the number of power circuits is large.

The electrical circuits of the present invention can be applied to a display device, such as an LCD monitor, an LCD television or an LCD computer. The display device may comprise, in addition to the controller, at least two CCFL power circuits, at least two transformers, at least two light sources and a display panel.

Figure 4:
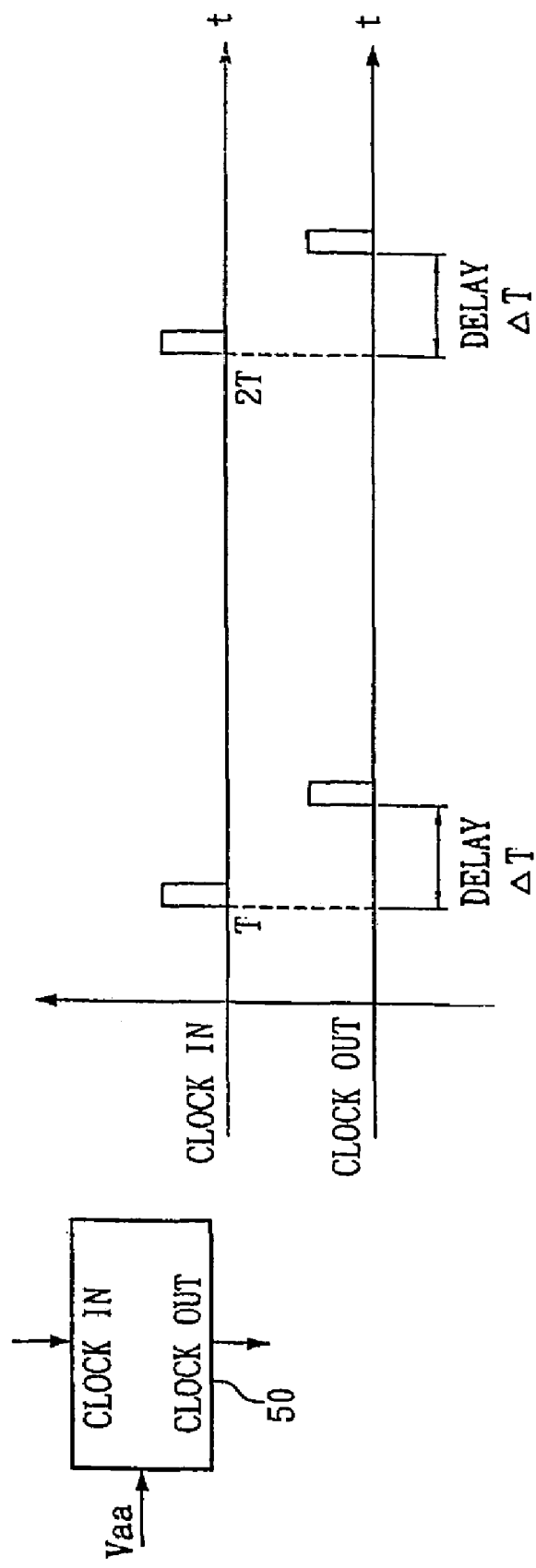
FIG. 4 is a signal representation of an input clock and an output clock for a DC/AC inverter.

FIG. 4 is a signal representation of an input clock and an output clock for a power circuit. There is a time delay, or a phase-delay, $\Delta T$, between the input clock signal and output clock signal or between two power circuits. The delay is a kind of phase shift delay and is generated by a delay circuit, which will be discussed later.

Figure 5:
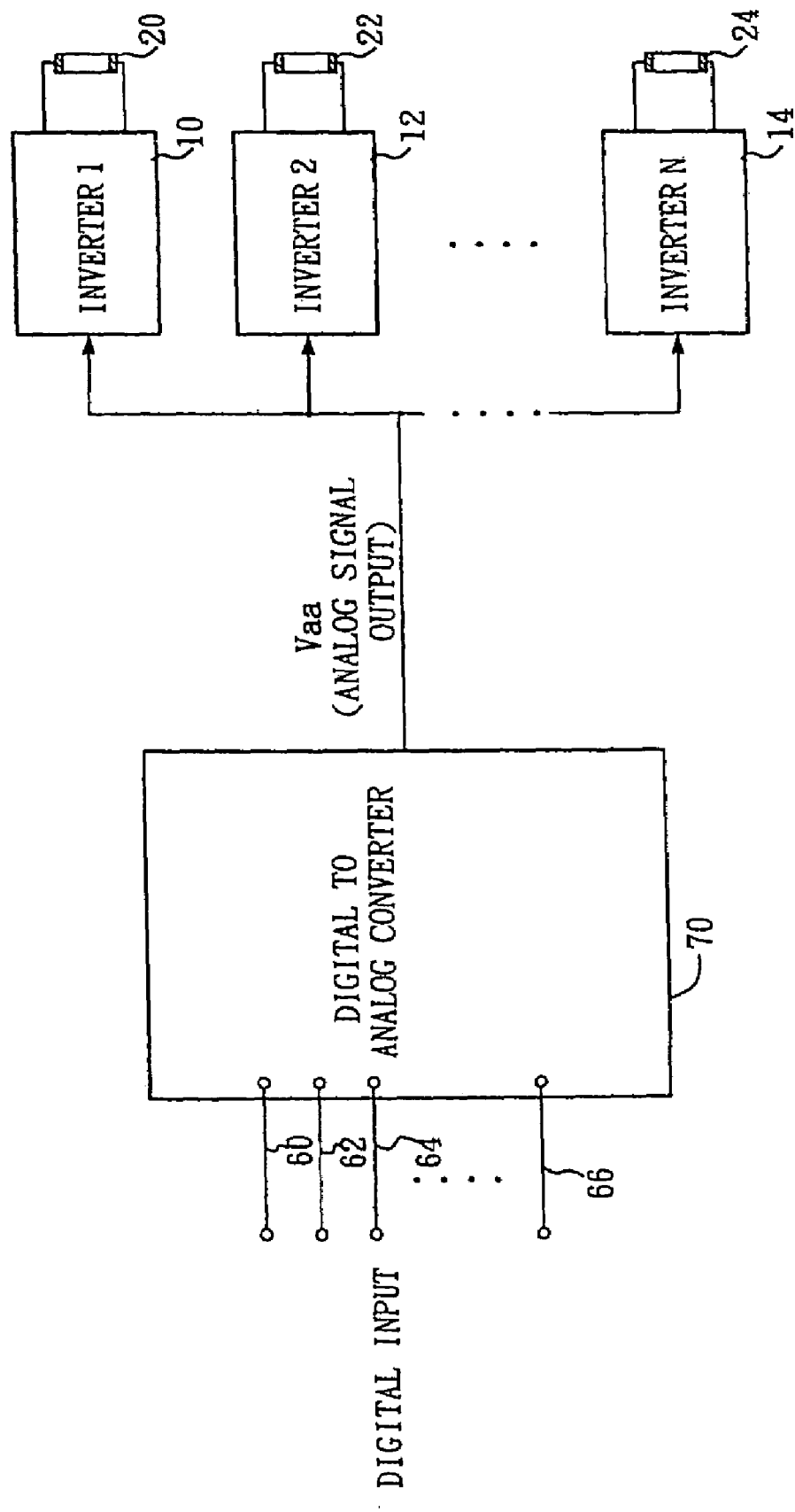
FIG. 5 is an exemplary selector circuit, wherein the inputs coupled to the selector circuit are digital signals and the output coupled to the DC/AC inverters is an analog signal.

FIG. 5 is an exemplary selector circuit (70), wherein the inputs (60, 62, 64, . . . 66) coupled to the selector circuit (70), such as a digital to analog converter, are digital signals and the output coupled to the power circuits (10, 12, . . . 14) is an analog signal (Vaa). The input signals coupled to the selector circuit (70), and their corresponding output signals are shown in FIG. 6. For example, if Vaa is 4/16, it means that there are four power circuits connected; and if Vaa is 15/16, it means that there are fifteen power circuits connected. That is to say, if the input terminals of the selector (70) are four, then the power circuits to be controlled can be programmed to sixteen.

Figure 7:
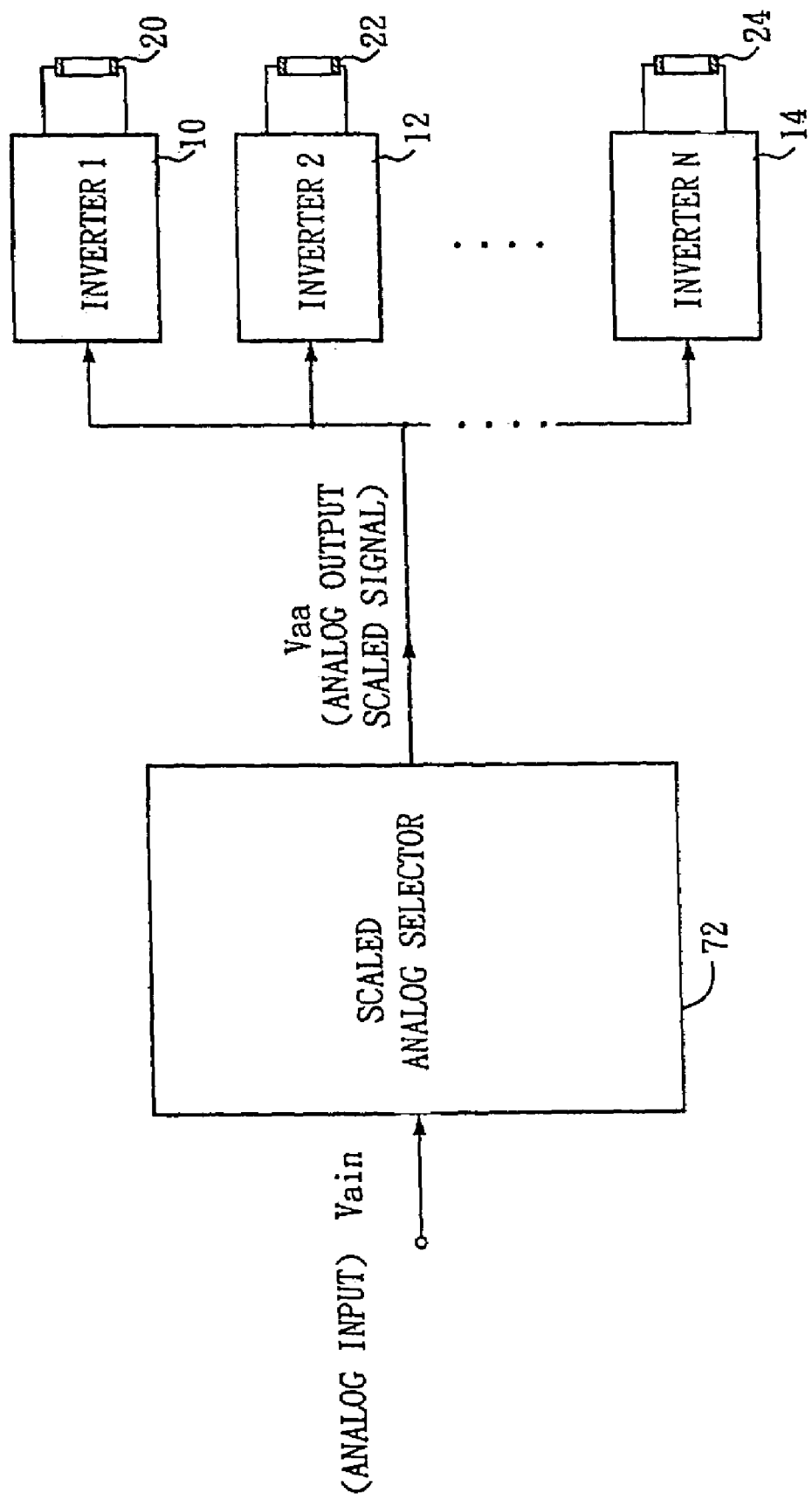
FIG. 7 is an exemplary selector circuit, wherein the input coupled to the selector circuit is an analog signal and the output coupled to the DC/AC inverters is an analog signal.
Figure 8:
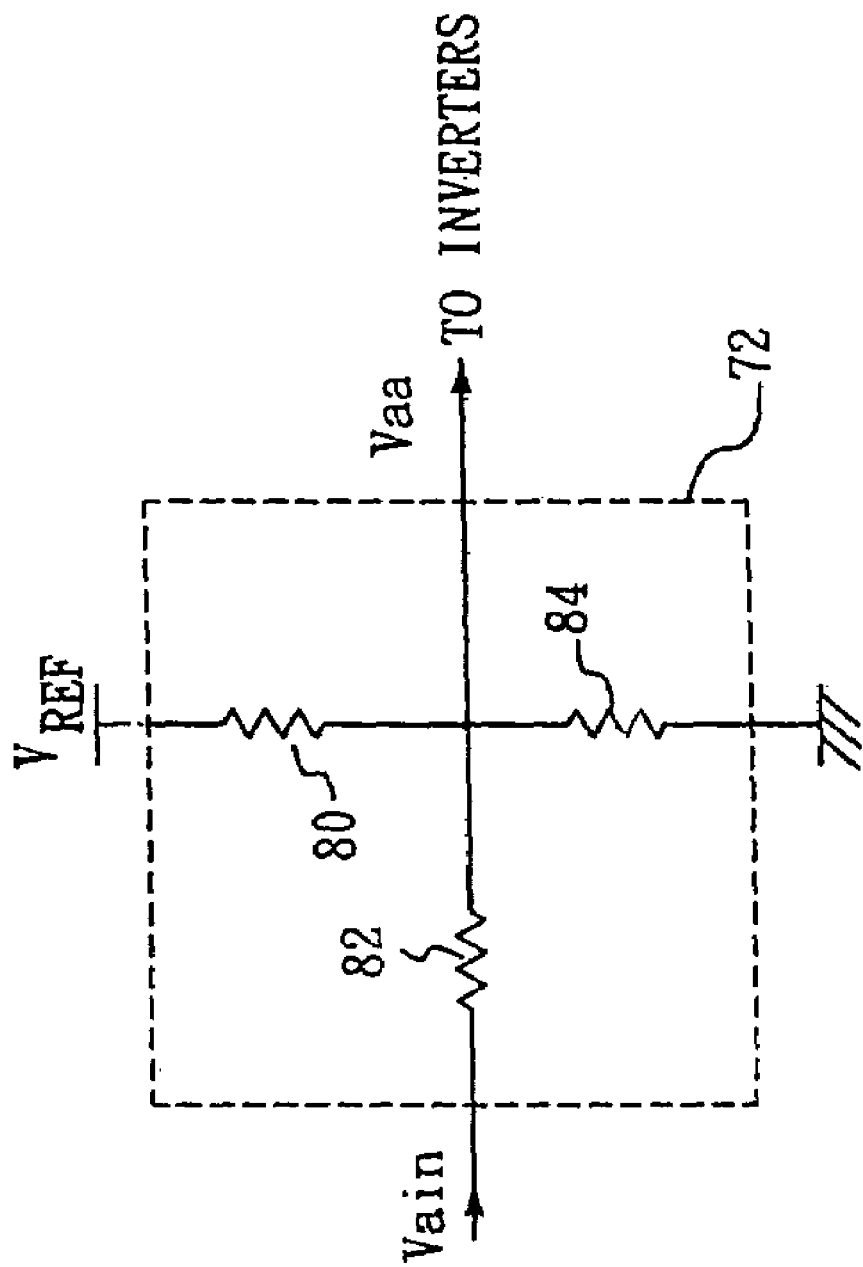
FIG. 8 is an exemplary schematic of the selector circuit illustrated in FIG. 7.

FIG. 7 illustrates another exemplary selector circuit (72), such as a scaled analog selector, wherein the input coupled to the selector circuit is an analog signal (Vain) and the output coupled to the power circuits (10, 12, . . . 14) is an analog signal (Vaa). FIG. 8 is an exemplary schematic of the selector circuit (72) illustrated in FIG. 7, wherein Vain stands for the analog input of the selector circuit (72) and Vaa stands for the analog output of the selector circuit (72). The value of Vaa can be obtained by using a superposition method based on the values of Vain, Vref and three resistors (80, 82, 84). After appropriate selection, the value of Vaa is proportional to Vain, such that the value of Vaa can be used to represent the number of power circuits connected.

Figure 9:
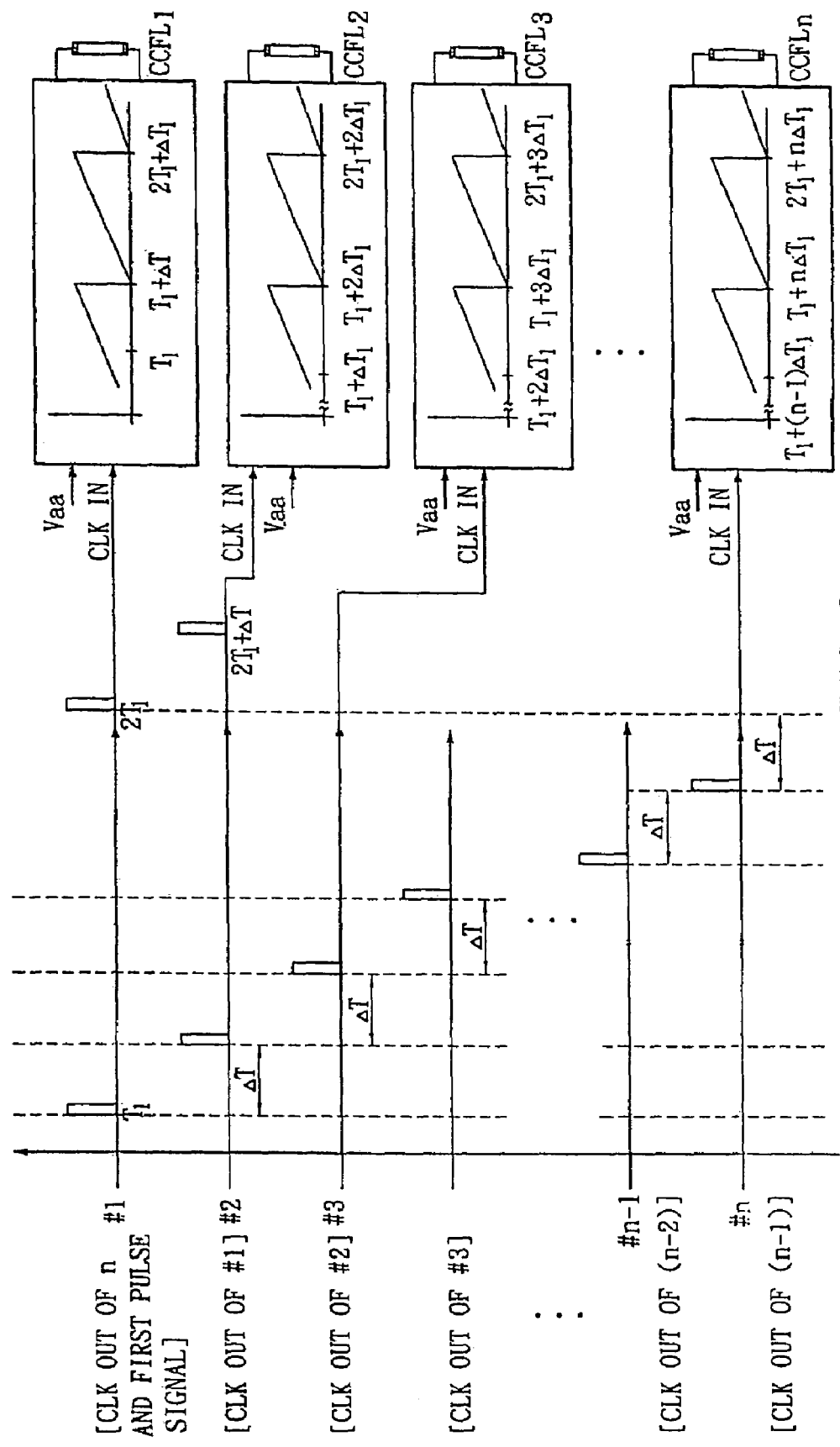
FIG. 9 is an exemplary schematic of a delay circuit of a DC/AC inverter comprising a ramp signal generated based on the input clock signal.

FIG. 9 is an exemplary schematic of a delay circuit in a power circuit comprising a ramp signal generated based on the input clock signal and the reference signal. The delay $\Delta T$ is generated by the delay circuit between each phase. FIG. 9 also illustrates a series of signals coupled to each CCFL sequentially, wherein the delay of initial point is generated by a ramp generator based on the first pulse signal and/or the reference signal.

Figure 10A:
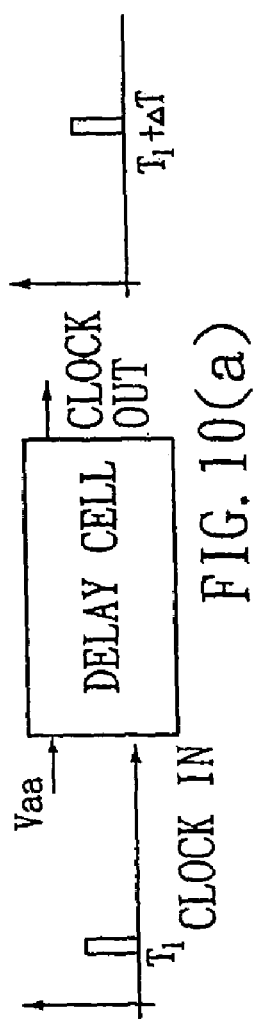
FIG. 10(a) is a schematic diagram of a delay cell in the present invention.
Figure 10B:
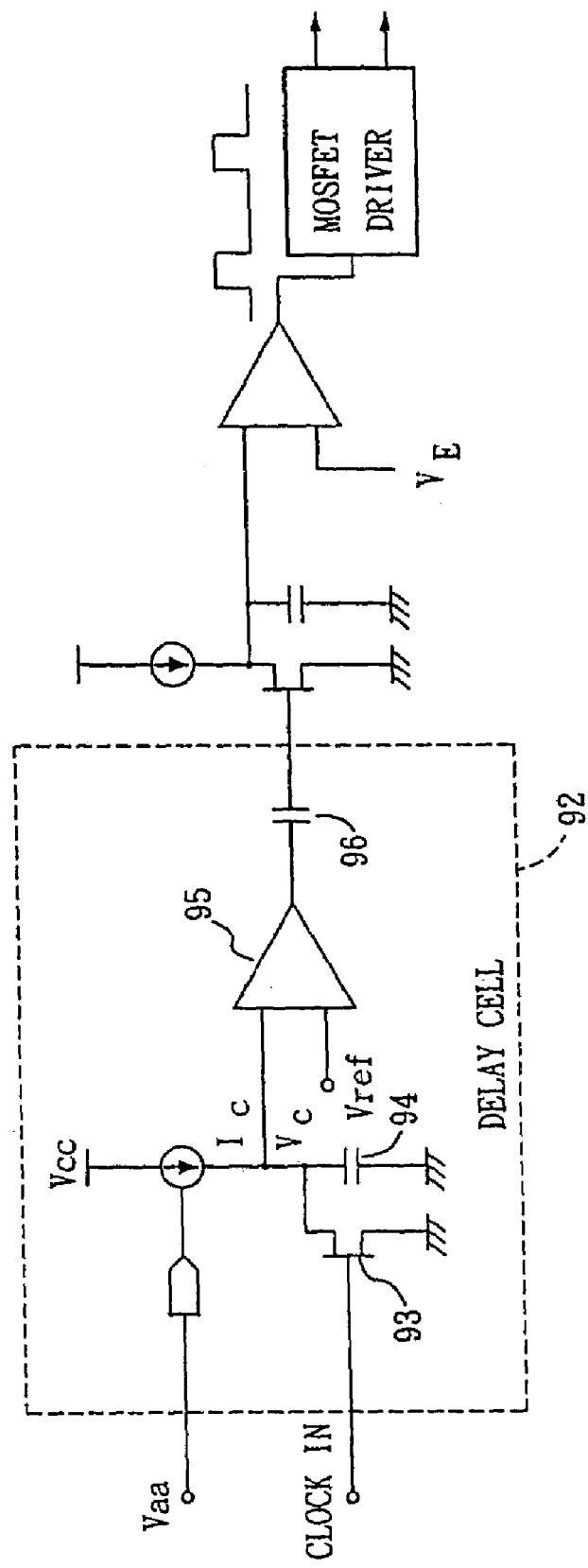
FIG. 10(b) is an exemplary delay circuit of a DC/AC inverter comprising a delay cell illustrated in FIG. 10(a) which is operated according to the input clock signal and the output signal of the selector circuit.

FIG. 10(a) is a schematic diagram of a delay cell in the present invention. It illustrates the delay $\Delta T$ generated by the delay cell between the clock in signal and clock out signal or two adjacent power circuits. FIG. 10(b) is an exemplary delay circuit of a power circuit comprising a delay cell (92) illustrated in FIG. 10(a). The delay $\Delta T$ is mainly determined by the reference signal Vaa. First of all, when a CLOCK IN signal is coupled to the delay cell (92) at the very beginning of time, the transistor (93) is turned on and the voltage Vc is dropped to 0V. Meanwhile, a capacitor (94) is charged by a current Ic once the CLOCK IN signal drops to turn off transistor (93) (starting of delay time) until the voltage on the capacitor (94) is higher than Vref. When the voltage on the capacitor (94) is higher than Vref, a comparator (95) will change state and generate a pulse signal (end of delay time) via a capacitor (96) to next stage. The current Ic is determined by a difference between Vaa and Vcc. In one example, the higher the value of Vaa is, the smaller current Ic will be and the more charge time there is. In other words, the delay time is increased. In another example, the higher the value of Vaa is, the higher current Ic will be and thus the less charge time there is. In other words, the delay time is decreased.

Figure 11A:
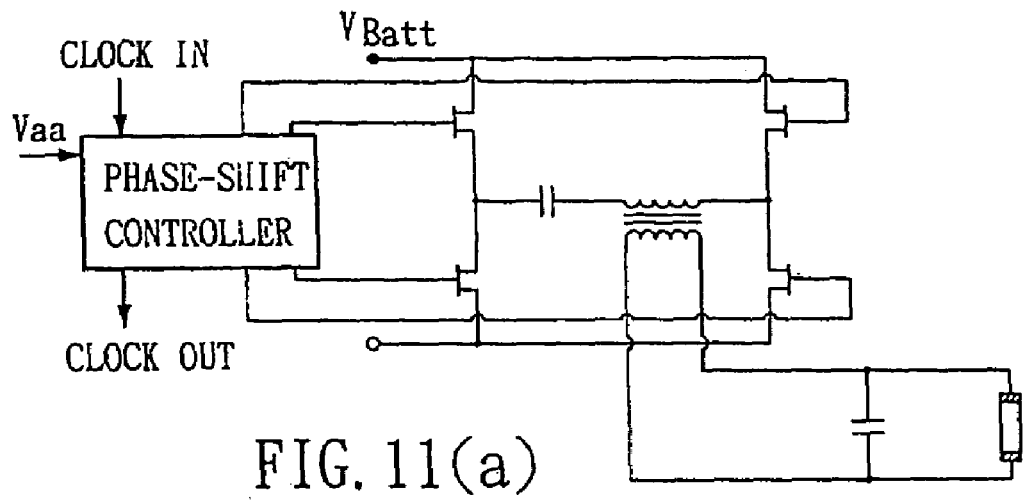
FIGS. 11(a)–11(e) are exemplary DC/AC inverters implementing the electrical circuit of the present invention.
Figure 11B:
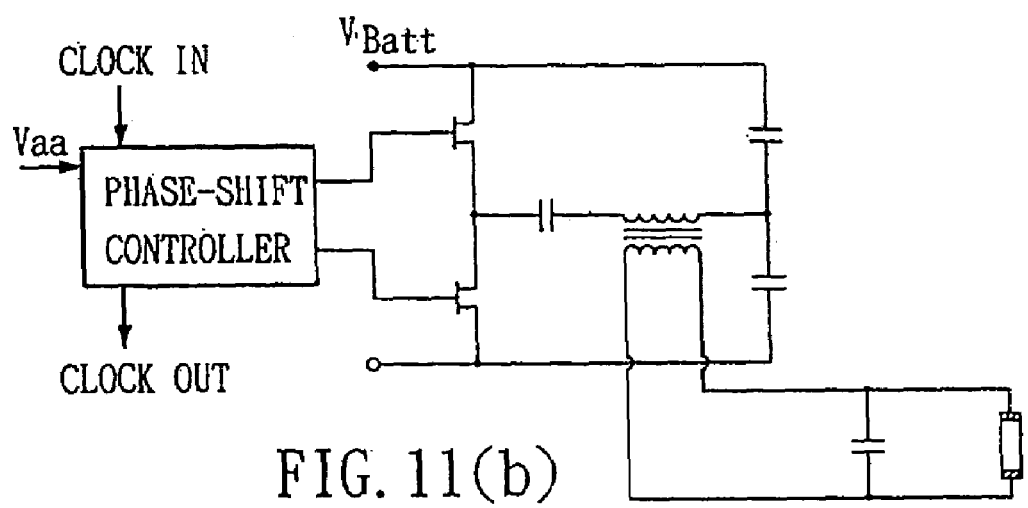
Figure 11C:
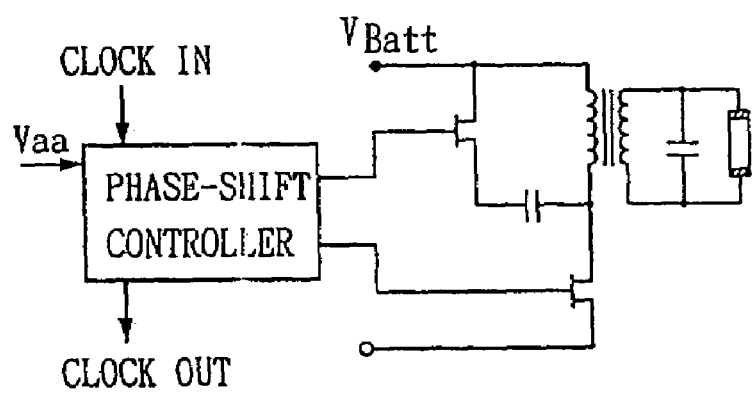
Figure 11D:
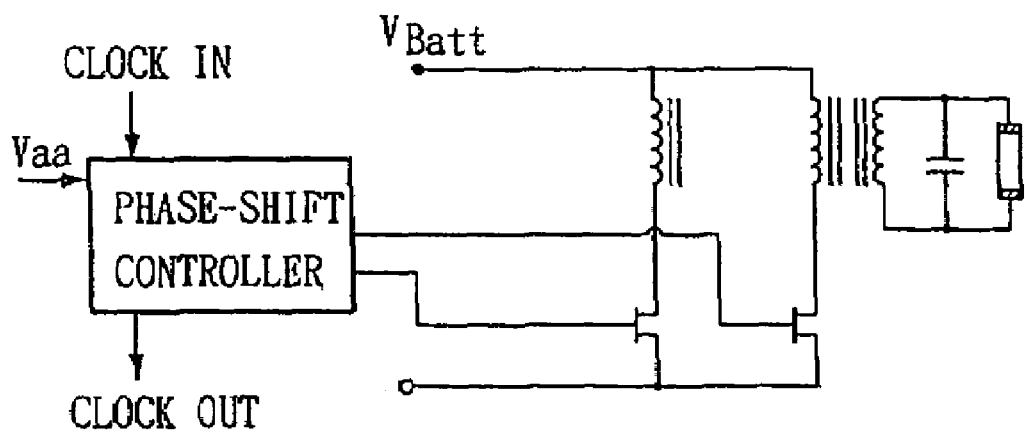
Figure 11E:
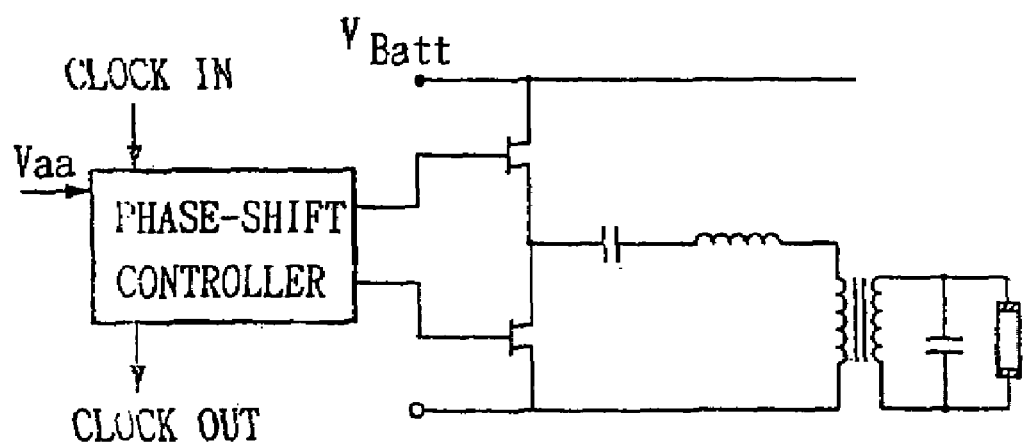

FIGS. 11(a)–11(e) are exemplary DC/AC inverters implementing the electrical circuit of the present invention. FIG. 11(a) is a full-bridge DC/AC inverter, FIG. 11(b) is a half-bridge DC/AC inverter, FIG. 11(c) is a fly-back forward DC/AC inverter, FIG. 11(d) is a push-pull DC/AC inverter and FIG. 11(e) is a class D DC/AC inverter.

Although the present invention and its advantage have been described in detail, it should be understood that various changes, substitutions and alternations can be made herein without departing from the spirit and scope of the invention as defined by the appended claims.

What is claimed is:

1. A controller for controlling at least two cold cathode fluorescent lamp (CCFL) power circuits, comprising
   a phase-shift selector for generating a reference signal, the reference signal being programmed to indicate an amount of phase-delay according to a number of CCFL power circuits connected; and
   a pulse generator for receiving the reference signal and generating a pulse signal in response to the received reference signal, the pulse signal being coupled to the at least two CCFL power circuits for initiating the operation of the at least two CCFL power circuits.

2. The controller of claim 1, wherein the phase-shift selector comprises at least one input terminal for programming the number of CCFL power circuits connected and an output for outputting the reference signal according to an input signal coupled to the at least one input terminal.

3. The controller of claim 2, wherein the input signal is an analog signal for selecting a number of phases or a digital signal for selecting a number of phases.

4. An electrical circuit for supplying energy to CCFL loads, comprising at least two CCFL power circuits, each of the at least two CCFL power circuits comprising a phase-delay selector for programming a phase-delay of the CCFL power circuit, wherein the amount of the phase-delay for each CCFL power circuit is stepwise increased according to operation sequence of the CCFL power circuits; and
   a controller having a phase-shift selector for generating a reference signal according to a number of the CCFL power circuits connected and a pulse generator for receiving the reference signal and generating a pulse signal in response to the received reference signal, the pulse signal being coupled to the at least two CCFL power circuits for initiating the operation of the at least two CCFL power circuits;
   wherein a first CCFL power circuit of the at least two CCFL power circuits is initiated immediately after the pulse signal is received and a second CCFL power circuit of the at least two CCFL power circuits is initiated after a predetermined amount of phase-delay.

5. The electrical circuit of claim 4, wherein the phase-shift selector comprises at least one input terminal for programming the number of CCFL power circuits connected and an output for outputting the reference signal according to an input signal coupled to the at least one input terminal.

6. The electrical circuit of claim 5, wherein the input signal is an analog signal for selecting a number of phases or a digital signal for selecting a number of phases.

7. The electrical circuit of claim 4, further comprising transformers.

8. The electrical circuit of claim 7, further comprising CCFL loads.

9. The electrical circuit of claim 4, wherein the CCFL power circuit further comprises a ramp generator for generating the phase-delay, and an initial point of the ramp generator occurs based on the pulse signal.

10. The electrical circuit of claim 4, wherein the CCFL power circuit further comprises a delay circuit for generating the programmed phase-delay.

11. A display device having CCFL loads, comprising
at least two CCFL power circuits, each of the at least two CCFL power circuits comprising a phase-delay selector for programming a phase-delay of the CCFL power circuit, wherein the amount of the phase-delay for each CCFL power circuit is stepwise increased according to operation sequence of the CCFL power circuits;
a controller having a phase-shift selector for generating a reference signal according to a number of the CCFL power circuits connected and a pulse generator for receiving the reference signal and generating a pulse signal in response the received reference signal, the pulse signal being coupled to the at least two CCFL power circuits for initiating the operation of the at least two CCFL power circuits;
at least two transformers, each coupled to the at least two CCFL power circuits, respectively;
at least two CCFL loads, each coupled to the at least two transformers, respectively; and
wherein a first CCFL power circuit of the at least two CCFL power circuits is initiated immediately after the pulse signal is received so as to turn on a first CCFL load of the at least two CCFL loads and a second CCFL power circuit of the at least two CCFL power circuits is initiated after a predetermined amount of phase-delay so as to turn on a second CCFL load of the at least two CCFL loads.

12. The display device of claim 11, wherein the CCFL power circuit further comprises a delay circuit for generating the programmed phase-delay.

13. The display device of claim 11, wherein the phase-shift selector comprises at least one input terminal for programming the number of CCFL power circuits connected and an output for outputting the reference signal according to an input signal coupled to the at least one input terminal.

14. The display device of claim 13, wherein the input signal is an analog signal for selecting a number of phases or a digital signal for selecting a number of phases.

15. The display device of claim 11, wherein the CCFL power circuit further comprises a ramp generator for generating the phase-delay, and an initial point of the ramp generator occurs based on the pulse signal.

16. A method for driving at least two CCFL power circuits, comprising the steps of
(a) generating a reference signal from the phase-shift selector;
(b) coupling the reference signal to a pulse generator;
(c) generating a pulse signal from the pulse generator in response to the reference signal and coupling the pulse signal to each of the at least two CCFL power circuits;
(d) initiating the operation of a first CCFL power circuit after receiving the pulse signal; and
(e) initiating the operation of a second CCFL power circuit after a predetermined amount of phase-delay.

17. The method of claim 16, wherein the phase-delay in the step (e) is generated by a delay circuit, and an amount of the phase-delay is programmed by a phase-delay selector in the CCFL power circuit.

18. The method of claim 16, wherein the reference signal in the step (a) is generated according to input signals coupled to the phase-shift selector.

19. The method of claim 16, wherein the step (d) further comprises the step of coupling the first CCFL power circuit to a first transformer.

20. The method of claim 19, further comprising the step of coupling the first transformer to a first CCFL load.

21. The method of claim 16, wherein the step (e) further comprises the step of coupling the second CCFL power circuit to a second transformer.

22. The method of claim 21, further comprising the step of coupling the second transformer to a second CCFL load.

23. The method of claim 16, wherein the phase-delay in the step (e) is generated by a ramp generator, and an initial point of the ramp generator occurs based on the pulse signal.

* * * * *

UNITED STATES PATENT AND TRADEMARK OFFICE
CERTIFICATE OF CORRECTION

PATENT NO.         : 7,200,017 B2                                      Page 1 of 1
APPLICATION NO.    : 10/756007
DATED              : April 3, 2007
INVENTOR(S)        : Lin It is certified that error appears in the above-identified patent and that said Letters Patent is hereby corrected as shown below:

On the face page, in field (63), under "Related U.S. Application Data", in column 1, line 1, delete "Continuation" and insert -- Continuation–in–part --, therefor.

In column 7, line 28, in Claim 11, after "response" insert -- to --.

Signed and Sealed this

Nineteenth Day of August, 2008

JON W. DUDAS
*Director of the United States Patent and Trademark Office*